United States Patent Office 3,039,540
Patented June 19, 1962

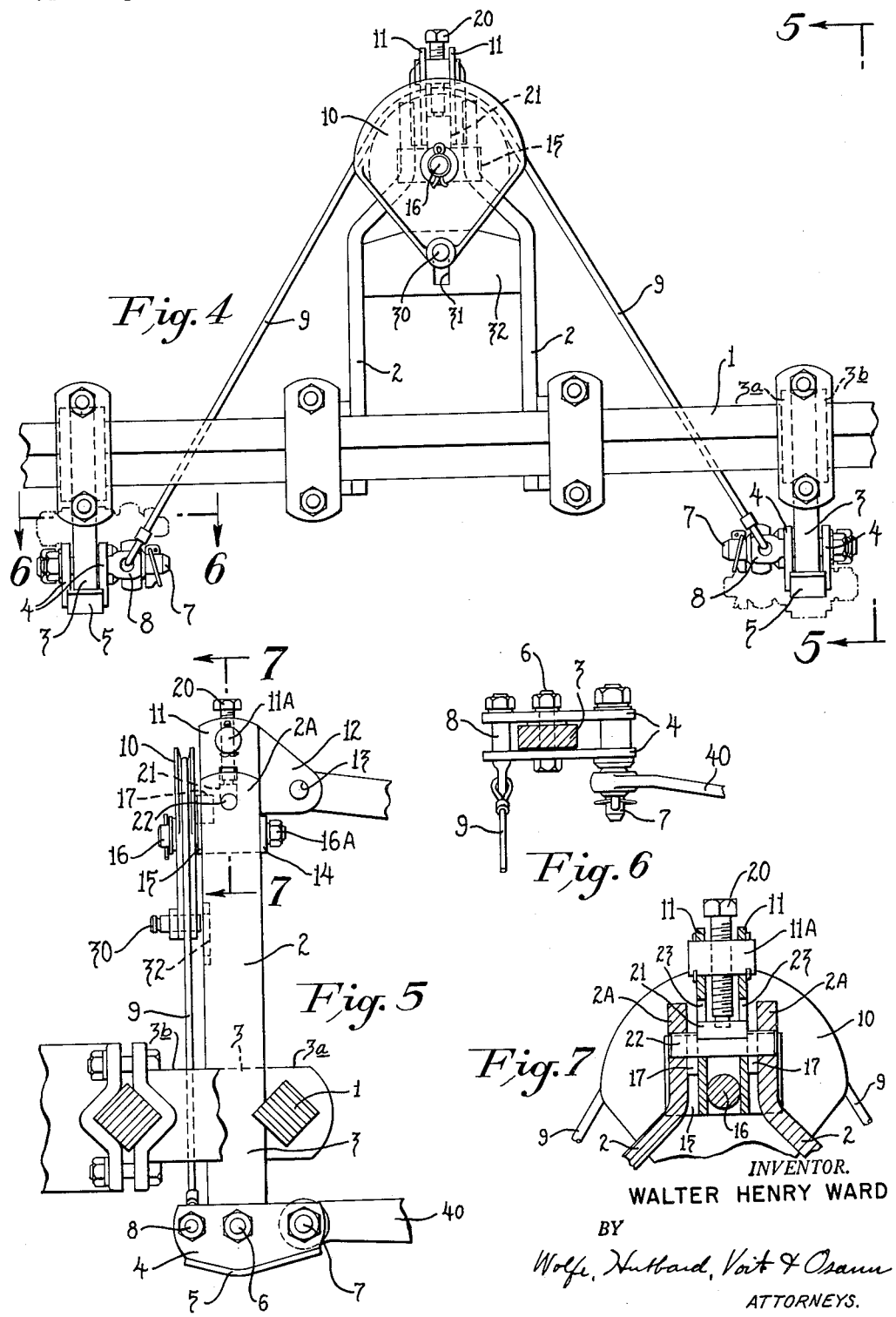

3,039,540
TRACTOR-IMPLEMENT HITCH TO ACCOMMO-
DATE SIDEWISE TILTING
Walter Henry Ward, Three Rivers, Vereeniging, Union
of South Africa, assignor to South African Farm Implement Manufacturers Limited, Peacehaven, Vereeniging, South Africa, a corporation of South Africa
Filed Sept. 9, 1959, Ser. No. 838,958
5 Claims. (Cl. 172—449)

This invention relates to implements adapted for so called unit mounting on tractors having power operated hitches including a lower pair of trailingly pivoted draft links operable by a power unit, usually a hydraulic ram operating a cross shaft with crank arms on its ends connected by links to the draft links. The hitch connection is completed by upper link means, usually a single center link, forming the well known three point hitch connection.

With such hitch connections the implement does not have freedom to tilt with reference to the tractor about a fore and aft axis because the two draft links are in effect rigidly interconnected. This has the disadvantages with wide implements that the implements cannot tilt laterally to follow the ground contour and that damaging twisting stresses can be set up in the links.

An object of the present invention is to provide a hitch connection for a unit mounted implement which avoids or mitigates these disadvantages.

A more specific object is to provide a hitch connection for an implement for unit mounting including hitch members for detachable connection with the tractor draft bers for detachable connection with the tractor draft links which are mounted on the implement for up and down movement relative thereto, and which are constrained to move in unison in opposite directions.

In order that the nature of invention may be clearly understood a preferred embodiment will now be described, by way of example, with reference to the accompanying diagrammatic drawings, in which:

FIG. 4 is a fragmentary view of the hitch connection on a somewhat enlarged scale.

FIG. 5 is a sectional view through the tool bar taken in a plane substantially on the line 5—5 of FIG. 4.

FIG. 6 is a fragmentary sectional view taken in a plane substantially on the line 6—6 of FIG. 4.

FIG. 7 is a fragmentary sectional view taken in a plane substantially on the line 7—7 of FIG. 5.

Figure 1:
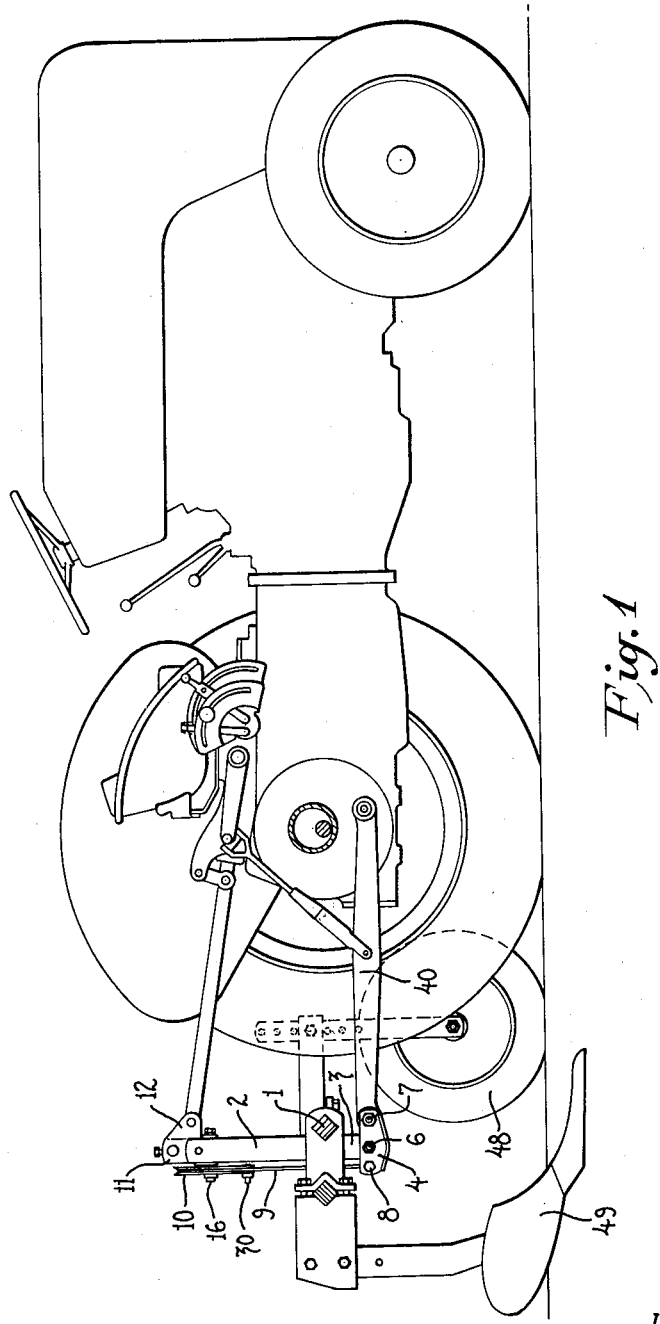
FIGURE 1 is a side view of a tractor and implement coupled by a hitch connection embodying the features of the invention.
Figure 2:
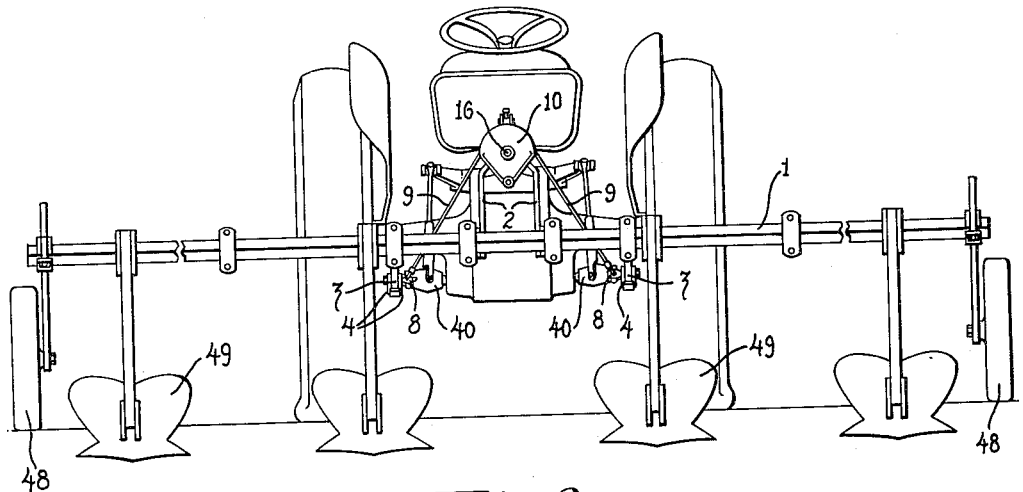
FIG. 2 is a rear view of the tractor-implement combination showing the implement in normal position relative to the trailer.
Figure 3:
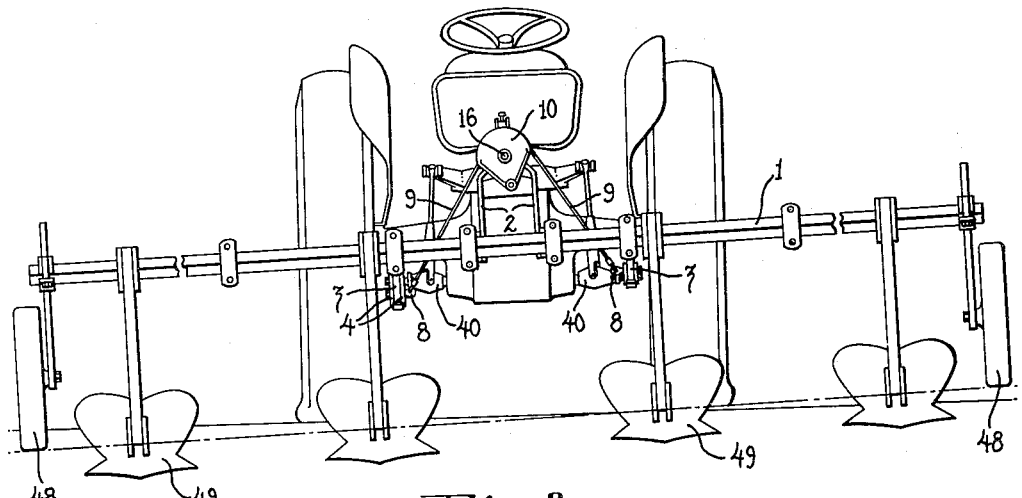
FIG. 3 is a view similar to FIG. 2 showing the implement tilted relative to the tractor.

Referring to FIGS. 1-3 of the drawings, the implement selected to illustrate the invention comprises the usual transverse toolbar 1 which has an upstanding centrally located frame 2 and downward extending brackets 3 laterally interspaced and having side plates 3a, 3b. The implement is provided with hitch connector members or links consisting of spaced bars 4 interconnected by a bottom member 5 (FIGS. 4 and 5). At their forward ends, each connector link carries a hitch pin 7 which is adapted for connection with the usual universal ball coupling in the rear ends of the hitch links 40 of a tractor. At their rear ends, each connector link 4 has a stud 8 having an eye therein to which is connected one end of a cable 9 which passes upwardly over a quadrant 10 mounted, in a manner to be described, at the top end of the upstanding frame 2. The connector links 4, 5 are pivoted intermediate their ends on pins 6 which are attached to the brackets 3, in place of the usual hitch pins for connection with the tractor links, said hitch pins now being the pins 7 at the forward end of the connector links 4, 5.

In the exemplary embodiment, the quadrant 10 is mounted by adjustable bracket means which permits it to be adjusted vertically to tighten or slacken the cable 9. This bracket means consists of interspaced plates 11 (FIGS. 5 and 7) having forward projections 12 provided with apertures 13. Two spaced cross members 14, 15 are attached to the plates 11 and carry an axle 16 for the quadrant 10, the axle 16 being held in position by a nut 16A which also serves to hold the cross members 14, 15 clamped on the plates 11. The cross member 15 has lugs 17 overlapping the plates 11.

The plates 11 fit down between lugs 2A at the top of the upright frame 2, and the cross members 14, 15 engage and guide on the edges of these lugs 2A, while the lugs 17 engage between the lugs 2A and the plates 11. It will thus be understood that the whole bracket assembly as described can be slipped down on to and guided into the lugs 2A and constitutes a readily detachable assembly.

Adjusting means for the quadrant 10 consists of a stud 20 which bears at its lower end on a saddle member 21 which rests on a cross pin 22 located in holes in the lugs 2A, said holes being the normal holes for the normal hitch pin for attaching the implement to the tractor top link. Slots 23 are provided in the plates 11 and the saddle member 21 engages in these slots.

If the stud 20 is screwed downwardly it reacts via the saddle member 21 on the fixed pin 22 and raises the whole bracket assembly and the quadrant 10, the stud 20 having screw engagement with a cross pin 11A engaging the plates 11.

The connectors 4, 5 in effect space the bottom of the implement further to the rear, since the normal hitch pin is now at 7 instead of at 6. However, parallelism of the implement is maintained since the bracket assembly at the top in effect moves the top hitch point forwardly from 22 to 13. Thus the whole implement is moved back but the trim is not upset.

Any suitable implements may be mounted on the toolbar 1, which is one of substantial width. Ground wheels 48 provided at each end, preferably vertically adjustable with respect to the toolbar 1, provide support for the implement. The implements may, for instance, be lister ploughs 49 such as those shown for splitting ridges.

When an implement is attached in the normal way to the bottom hitch links it cannot tilt laterally with reference to the tractor and, as already explained, this prevents, especially in the case of a wide implement, proper following of the ground contour and in addition may give rise to serious stresses in the implement and tractor links. In the present arrangement, the provision of the hinged connectors 4, 5 will enable the implement to rise and fall with reference to the tractor links. Thus in operation the ground wheels at each end of the implement will cause it to follow the ground contour and the hinged links 4, 5 will permit the necessary tilting of the implement in either direction from the level position shown in FIG. 2. FIG. 3, for example, shows the implement tilted to the left.

In the transition from the level condition shown in FIG. 2 to the leftwardly tilted condition shown in FIG. 3, dropping of the left hand end of the implement, acting upon the left hand rocking links 4, causes the links to swing downwardly pulling upon the cable 9 and causing the quadrant 10 to swing slightly to the left. Under such circumstances the links 4 on the right side may swing upwardly a short distance; however, since the quadrant 10 has a slight downward component of movement, the net effect is to move the implement, at the center line of the tractor, downward with respect to the tractor by a small amount. Thus tilting is accomplished entirely by motion of the quadrant 10 and the rocking links 4.

Due to the provision of the interconnecting cable 9 and the means for adjusting the quadrant 10, a substantial part of the implement weight is still to be carried on the tractor links despite this freedom for tilting. This is a desirable feature for traction and one which is particularly advantageous in a tractor of the type having automatic draft or depth control. For instance, in operation the implement can first be allowed to go down to the predetermined depth as selected by the adjustment of the ground wheels at each end of the toolbar. Thereupon, the bracket assembly can be raised by means of the stud 20 to tighten the cable 9 until most of the weight is removed from the ground wheels which will then merely provide a guiding rather than a supporting action. Thereafter in operation the implement may tilt freely within predetermined limits, and for the most part there is still the weight transfer via the cable.

The arrangement also has a self-centering or stabilising effect which is found to be beneficial. Thus, if the implement rocks, due to the swinging upwards and downwards of the respective links 4 and 5, the bottom of the implement slightly approaches the tractor against the draft force. Thus, there is the self-centering or stabilising effect which is found desirable, but which does not materially impede the freedom to tilt.

Locking means may be provided to cut out the tilting action when not required, for instance, when the implement is raised out of the ground to its transport position. This means may consist of a pin 30 which can be pushed forwardly from the position shown in FIG. 5 to engage a slot 31 (FIG. 4) in a locking plate 32 attached to the frame 2.

Instead of having ground wheels adjustably and individually attached at the ends of the implement, there may be provided a cross shaft or tube rotatably mounted on the implement and having a forwardly and downwardly projecting arm at each end carrying a ground wheel of substantial weight. Normally the weight of these wheels rests on the ground and owing to the rotatable mounting of the shaft the implement can rise and fall in parallel with reference to the shaft and wheels and thus be subjected to automatic draft or depth control with full transfer of the implement weight to the tractor. The shaft and wheel assembly acts purely as a bias means to tilt the implement to follow ground contour. Thus if the ground contour falls away at one side the wheel at that side, owing to its weight, will drop and rotate the shaft which will by reaction of the other wheel on the ground raise the implement at the other side. Thus the implement will be tilted to follow the ground contour.

I claim as my invention:

1. Hitch mechanism for connecting an implement to a tractor having laterally spaced trailing draft links and power operated means for raising and lowering the links in unison, said mechanism comprising a pair of brackets rigid with the frame of the implement and spaced apart laterally similar to the trailing ends of the draft links, a connector link pivotally mounted intermediate its ends on each bracket and extending forwardly and rearwardly therefrom, a pin carried at the forward end of each connector link engageable with one of the draft links to operatively connect the implement thereto, and means connected between said connector links effective to constrain them to swing about their pivots in unison in opposite directions to vary the vertical positioning of said pins whereby to accommodate tilting of the implement relative to the tractor.

2. Hitch mechanism for connecting an implement having a transversely disposed tool bar to a tractor having laterally spaced trailing draft links and power operated means for raising and lowering the links in unison, said mechanism comprising, in combination, a pair of rigid brackets depending from the toolbar and spaced apart similarly to the trailing ends of the draft links, a connector link pivotally mounted on each bracket to swing about an axis parallel to the toolbar, a pin carried by each link at one side of its pivot engageable with one of the draft links to operatively connect the implement therewith, and means connected between said links constraining them to swing in unison in opposite directions to accommodate tilting of the toolbar relative to the tractor.

3. Hitch mechanism for connecting an implement having an elongated transverse frame member with a tractor having a hitch linkage including a pair of lower laterally spaced draft links and an upper control link, said mechanism comprising, in combination, a pair of brackets rigidly secured to the implement frame member and spaced apart similarly to the draft links, a pair of elongated elements having spaced pivot connections with the respective brackets and one of the draft links, an upright frame rigid with the transverse frame member, coupling means adjacent the upper end of said upright frame for connection with the upper link, a peripherally grooved member supported on said upright frame to rock about a fore-and-aft axis, and a flexible tension element trained over said member and connected at opposite ends to the respective pivoted elements to constrain them to swing in unison in opposite directions to accommodate tilting of the implement relative to the tractor.

4. Hitch mechanism for connecting an implement having an elongated transverse frame member with a tractor having a hitch linkage including a pair of lower laterally spaced draft links and an upper control link, said mechanism comprising, in combination, a pair of brackets rigidly secured to the implement frame member and spaced apart similar to the draft links, a pair of elongated elements having spaced pivot connections with the respective brackets and one of the draft links, an upright frame rigid with the transverse frame member, coupling means adjacent the upper end of said upright frame for connection with the upper link, a support block mounted on said upright frame for movement vertically, a peripherally grooved member supported on said block to rock about a fore-and-aft axis, a flexible tension element trained over said member and connected at opposite ends to the respective pivoted elements to constrain them to swing in unison in opposite directions to accommodate the tilting of the implement relative to the tractor, and manually operable means for shifting said block relative to the frame to adjust the tension of said flexible member.

5. Hitch mechanism for connecting an implement having an elongated transverse frame member with a tractor having a hitch linkage including a pair of lower laterally spaced draft links and an upper control link, said mechanism comprising, in combination, a pair of brackets rigidly secured to the implement frame member and spaced apart similarly to the draft links, a pair of elongated elements having spaced pivot connections with the respective brackets and one of the draft links, an upright frame rigid with the transverse frame member, coupling means adjacent the upper end of said upright frame for connection with the upper link, a member pivoted on said frame to rock about a fore-and-aft axis, said member having an outwardly facing groove along its upper edge arcuate about the pivot axis of the member, a segmental extension of said member extending below said pivot axis, a flexible tension member trained over the grooved portion of said member and connected at opposite ends to said pivoted elements to constrain them to swing in unison in opposite directions for accommodating tilting of the implement relative to the tractor, and means for locking said member against rocking movement to restrain the implement against tilting relative to the tractor.

References Cited in the file of this patent

UNITED STATES PATENTS

| | | |
|---|---|---|
| 2,599,617 | Davis | June 10, 1952 |
| 2,653,531 | Collins | Sept. 29, 1953 |
| 2,673,509 | Wilson | Mar. 30, 1954 |
| 2,685,242 | Rusco | Aug. 3, 1954 |
| 2,915,130 | Todd | Dec. 1, 1959 |

FOREIGN PATENTS 1,093,802 France _____ Nov. 24, 1954
(Corresponding to U.S., Gardner 2,697,393, Dec. 21, 1954)